US008554010B2

(12) United States Patent
Hasegawa

(10) Patent No.: US 8,554,010 B2
(45) Date of Patent: Oct. 8, 2013

(54) IMAGE PROCESSING APPARATUS COMBINING PLURAL SETS OF IMAGE DATA AND METHOD FOR CONTROLLING THE SAME

(75) Inventor: Naoyuki Hasegawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 612 days.

(21) Appl. No.: 12/827,289

(22) Filed: Jun. 30, 2010

(65) Prior Publication Data

US 2011/0013848 A1 Jan. 20, 2011

(30) Foreign Application Priority Data

Jul. 15, 2009 (JP) ................................ 2009-167264

(51) Int. Cl.
*G06K 9/40* (2006.01)
(52) U.S. Cl.
USPC ........... 382/274; 382/168; 382/276; 382/293; 382/294; 348/207.99; 348/218.1; 348/222.1; 348/239; 348/254
(58) Field of Classification Search
None
See application file for complete search history.

(56) References Cited

U.S. PATENT DOCUMENTS

| 7,593,585 | B2 | 9/2009 | Ishida | 382/254 |
|---|---|---|---|---|
| 8,050,511 | B2 * | 11/2011 | Daly et al. | 382/274 |
| 8,050,512 | B2 * | 11/2011 | Daly et al. | 382/274 |
| 8,248,485 | B2 * | 8/2012 | Ishii et al. | 348/222.1 |
| 8,248,486 | B1 * | 8/2012 | Ward et al. | 348/223.1 |
| 8,339,468 | B2 | 12/2012 | Katagiri et al. | |
| 2005/0013501 | A1 * | 1/2005 | Kang et al. | 382/254 |
| 2007/0040914 | A1 * | 2/2007 | Katagiri et al. | 348/221.1 |
| 2007/0097228 | A1 * | 5/2007 | Kuniba | 348/222.1 |
| 2009/0059026 | A1 | 3/2009 | Katagiri et al. | |
| 2010/0194919 | A1 * | 8/2010 | Ishii et al. | 348/224.1 |
| 2010/0195901 | A1 * | 8/2010 | Andrus et al. | 382/162 |
| 2010/0271512 | A1 * | 10/2010 | Garten | 348/239 |

FOREIGN PATENT DOCUMENTS

| JP | 2000-149014 A | 5/2000 |
|---|---|---|
| JP | 2005-063406 | 3/2005 |
| JP | 2008-104009 A | 5/2008 |
| JP | 2009-059058 A | 3/2009 |

OTHER PUBLICATIONS

Edwin H. Land et al., "Lightness and Retinex Theory," Journal of the Optical Society of America, vol. 61, No. 1, Jan. 1971, pp. 1-11.
Jiangtao Kuang et al., "Icam06: a refined image appearance model for HDR image rendering," Journal of Visual Communication, 2007—17 pages.
Japanese Office Action dated Jun. 18, 2013, issued in counterpart Japanese Application No. 2009-167264.

* cited by examiner

*Primary Examiner* — Matthew Bella
*Assistant Examiner* — Jason Heidemann
(74) *Attorney, Agent, or Firm* — Fitzpatrick, Cella, Harper & Scinto

(57) ABSTRACT

An image processing apparatus that generates image data having a high dynamic range by combining a plurality of image data having different exposure amounts includes: an input unit configured to input a plurality of M-bit image data; a determining unit configured to determine reference image data serving as an exposure reference from among the plurality of input M-bit image data; a composition unit configured to combine the plurality of M-bit image data, and generate one N-bit composite image data (N>M); a characteristic parameter setting unit configured to set a characteristic parameter of tone compression on the N-bit composite image data such that a predetermined reference luminance in the reference image data does not change; and a generating unit configured to generate M-bit composite image data by compressing a luminance tone of an image component based on the set characteristic parameter.

7 Claims, 16 Drawing Sheets

FIG. 17

| HIGHLIGHT PIXEL RATIO \ SHADOW PIXEL RATIO | LESS THAN 10% | 10% OR MORE |
|---|---|---|
| LESS THAN 10% | NO CORRECTION | CORRECT SHADOW DETAIL LOSSES |
| 10% OR MORE | CORRECT HIGHLIGHT DETAIL LOSSES | CORRECT SHADOW AND HIGHLIGHT DETAIL LOSSES |

FIG. 18

| SHADOW PIXEL RATIO HIGHLIGHT PIXEL RATIO | CORRECTION DEGREE |
|---|---|
| 10% OR MORE AND LESS THAN 20% | LOW |
| 20% OR MORE AND LESS THAN 30% | MEDIUM |
| 30% OR MORE | HIGH |

FIG. 19

| CORRECTION METHOD<br>CORRECTION DEGREE | CORRECT HIGHLIGHT DETAIL LOSSES | CORRECT SHADOW DETAIL LOSSES | CORRECT HIGHLIGHT AND SHADOW DETAIL LOSSES |
|---|---|---|---|
| LOW | 1.0 | 0.9 | 0.9 |
| MEDIUM | 1.0 | 0.75 | 0.75 |
| HIGH | 1.0 | 0.6 | 0.6 |

FIG. 20

| CORRECTION METHOD<br>CORRECTION DEGREE | CORRECT HIGHLIGHT DETAIL LOSSES | CORRECT SHADOW DETAIL LOSSES | CORRECT HIGHLIGHT AND SHADOW DETAIL LOSSES |
|---|---|---|---|
| LOW | 1.5 | 1.0 | 1.5 |
| MEDIUM | 2.0 | 1.0 | 2.0 |
| HIGH | 2.5 | 1.0 | 2.5 |

IMAGE PROCESSING APPARATUS COMBINING PLURAL SETS OF IMAGE DATA AND METHOD FOR CONTROLLING THE SAME

BACKGROUND OF THE INVENTION

1. Field of the Invention

The present invention relates to an image processing technique, in particular, a tone-correction technique for digital image data.

2. Description of the Related Art

Currently, the household penetration of digital cameras in Japan is more than 50%, and the act of "taking a photo with a digital camera" is very common. In the case where a user takes a photo with a digital camera outdoors, the luminance range of a scene that is to be photographed may be wider than a photographable luminance range. At that time, tone information of a subject that is outside the photographable luminance range cannot be recorded, and, thus, a highlight or shadow detail loss occurs. For example, in the case where a person is photographed outdoors in fine weather, if the exposure is matched to the person, a highlight detail loss may occur in the sky or clouds in the background, or a shadow detail loss may occur in a tree shade. However, as typified by the Retinex model in the document "Edwin H. Land and John J. McCann, "Lightness and Retinex Theory", Journal of the Optical Society of America, Vol. 61, Num 1, 1971", human vision more sensitively detects the reflectance of an object, and can sense the tone both in light places and in dark places. Accordingly, the impression of a certain scene to the eye and the impression of the same scene in a photographed image may differ, which causes dissatisfaction to digital camera users.

One of the techniques for solving this sort of problem is a high dynamic-range (HDR) technique. The HDR technique is configured roughly from the HDR capture technique and the dynamic-range compression technique. The HDR capture technique is a technique for recording tone information of a luminance range in which a highlight or shadow detail loss has occurred, by increasing the photographable dynamic range. For example, there is a method in which images photographed with a plurality of exposures are combined. Hereinafter, an image captured by this HDR capture is referred to as an HDR image. Meanwhile, the dynamic-range compression technique is an image processing technique for preferably reproducing an HDR image having a wide dynamic range, with a display and output apparatus having a narrow dynamic range. According to these HDR techniques, highlight and shadow detail losses in a photographed image can be reduced. Various dynamic-range compression methods have been proposed, and, for example, the document "Kuang, J., Johnson, G. M., and Fairchild M. D., "iCAM06: A refined image appearance model for HDR image rendering", Journal of Visual Communication, 2007" describes a dynamic-range compression method that reproduces a real scene the way it looks to the eye.

However, among users of conventional cameras, acceptance of photographic reproduction using the above-described HDR technique is lower than that of photographic reproduction using conventional cameras. More specifically, although a highlight portion may have a high dynamic range, the image may seem strange to a user, for example, the exposure may seem to have been altered, a dull expression may be provided, the color may seem to have been altered, or the saturation in a night scene image may appear lower.

SUMMARY OF THE INVENTION

The present invention provides a technique for obtaining photographic reproduction having a more natural tone that does not feel strange, in comparison with photographic reproduction using a conventional camera.

According to one aspect of the present invention, an image processing apparatus that generates image data having a high dynamic range by combining a plurality of sets of image data having different exposure amounts, comprises: an input unit configured to input a plurality of sets of M-bit image data that are to be combined; a determining unit configured to determine reference image data serving as an exposure reference from among the plurality of sets of input M-bit image data; a composition unit configured to combine the plurality of sets of M-bit image data, and generate one set of N-bit composite image data (N>M); a characteristic parameter setting unit configured to set a characteristic parameter of tone compression on the N-bit composite image data such that a predetermined reference luminance in the reference image data does not change; and a generating unit configured to generate M-bit composite image data by compressing a luminance tone of an image component having a frequency lower than a predetermined frequency contained in the N-bit composite image data based on the set characteristic parameter.

According to another aspect of the present invention, a method for controlling an image processing apparatus that generates image data having a high dynamic range by combining a plurality of sets of image data having different exposure amounts, comprises: an input step, in which an input unit inputs a plurality of sets of M-bit image data that are to be combined; a determining step, in which a determining unit determines reference image data serving as an exposure reference from among the plurality of sets of input M-bit image data; a composition step, in which a composition unit combines the plurality of sets of M-bit image data, and generates one set of N-bit composite image data (N>M); a characteristic parameter setting step, in which a characteristic parameter setting unit sets a characteristic parameter of tone compression on the N-bit composite image data such that a predetermined reference luminance in the reference image data does not change; and a generating step, in which a generating unit generates M-bit composite image data by compressing a luminance tone of an image component having a frequency lower than a predetermined frequency contained in the N-bit composite image data based on the set characteristic parameter.

The present invention can provide a technique for obtaining photographic reproduction having a more natural tone.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 17 is a view showing an example of a correction-method determining table.

FIG. 18 is a view showing an example of a correction-degree determining table.

FIG. 19 is a view showing an example of an SCD table.

FIG. 20 is a view showing an example of an HCD table.

DESCRIPTION OF THE EMBODIMENTS

Hereinafter, preferred embodiments of the present invention will be described in detail with reference to the drawings. However, it should be noted that the following embodiments are to be taken as examples only; the scope of the present invention is not intended to be limited by the individual embodiments described hereinafter.

First Embodiment

Hereinafter, a first embodiment of an image processing apparatus according to the present invention will be described using, as an example, a personal computer (PC) that executes image processing software.

Configuration of Apparatus

Figure 1:
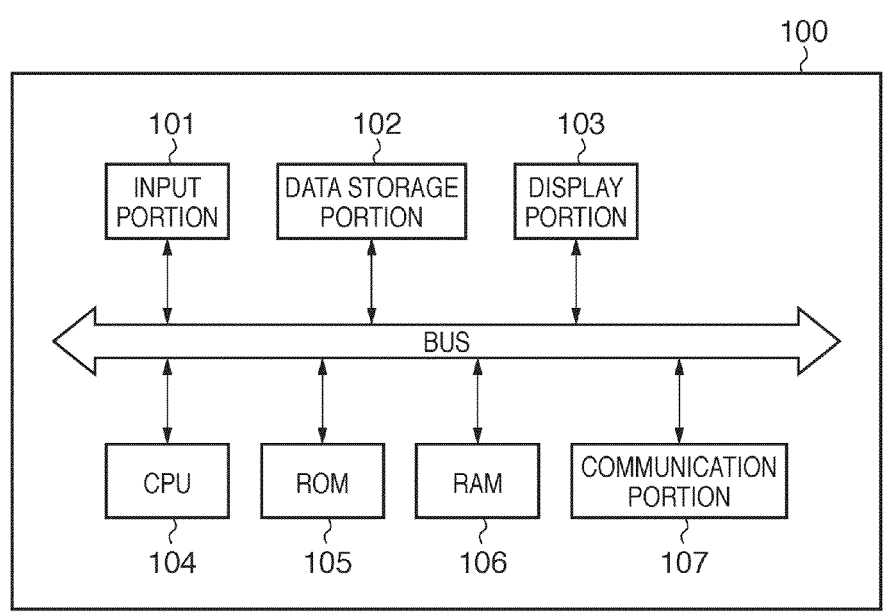
FIG. 1 is a diagram showing the internal configuration of an image processing apparatus according to a first embodiment.

FIG. 1 is a diagram showing the internal configuration of an image processing apparatus 100 according to the first embodiment. An input portion 101 is a device that is used to input user instructions or data, and examples thereof include a keyboard and a pointing device. Here, examples of the pointing device include a mouse, a track ball, a track pad, a tablet, and the like. Alternatively, in the case where this example is applied to apparatuses such as known digital cameras or printers, the input portion may be configured as a button, a mode dial, or the like. Furthermore, a configuration is also possible in which a keyboard is configured as software (software keyboard), and a button or a mode dial, or the above-described pointing device is operated to input characters.

A data storage portion 102 is a device that stores image data, and examples thereof typically include a hard disk, a Floppy disk (registered trademark), an optical disk (a CD-ROM, a CD-R, or a DVD), a memory card (a CF card, a SmartMedia, SD card, a memory stick, an xD picture card), a USB memory, and the like. The data storage portion 102 can store not only image data, but also programs and other data. Alternatively, part of a RAM 106 (described later) may be used as the data storage portion 102. Furthermore, a virtual configuration is also possible in which a data storage portion of an apparatus connected to a communication portion 107 (described later) is used via the communication portion 107.

A display portion 103 is a device that displays images of before and after processing, an image of a graphical user interface (GUI) or the like. Examples thereof typically include a CRT, a liquid crystal display, and the like. Alternatively, the display portion also may be an external display device that is connected to the apparatus via a cable or the like. Furthermore, the display portion also may be a known touch screen. In this case, input using the touch screen may be treated as input from the input portion 101.

Numeral 104 denotes a CPU that controls the above-described portions by executing various control programs. A ROM 105 and the RAM 106 provide the CPU 104 with programs, data, working areas, and the like necessary for the processing. Furthermore, in the case where a control program necessary for processing (described later) is stored in the data storage portion 102 or the ROM 105, the control program is once loaded into the RAM 106 and then executed. Furthermore, in the case where the program is received by the apparatus via the communication portion 107, the program is once recorded in the data storage portion 102 and loaded into the RAM 106, or directly loaded from the communication portion 107 into the RAM 106, and then executed.

The communication portion 107 is a functional portion for performing communication between apparatuses. As a communication method, a known wired connection (Ethernet (registered trademark), USB, IEEE1284, IEEE1394, telephone lines, etc.) can be used. Furthermore, wireless communication methods also may be used, such as infrared communication (IrDA, etc.), wireless LAN (IEEE802.11 series, etc.), Bluetooth (registered trademark), UWB (ultra wide band), or the like.

Here, in FIG. 1, all of the input portion 101, the data storage portion 102, and the display portion 103 are included in one apparatus. However, a system is also possible in which these portions are connected via a given communication path.

Operation of the Apparatus

Figure 2:
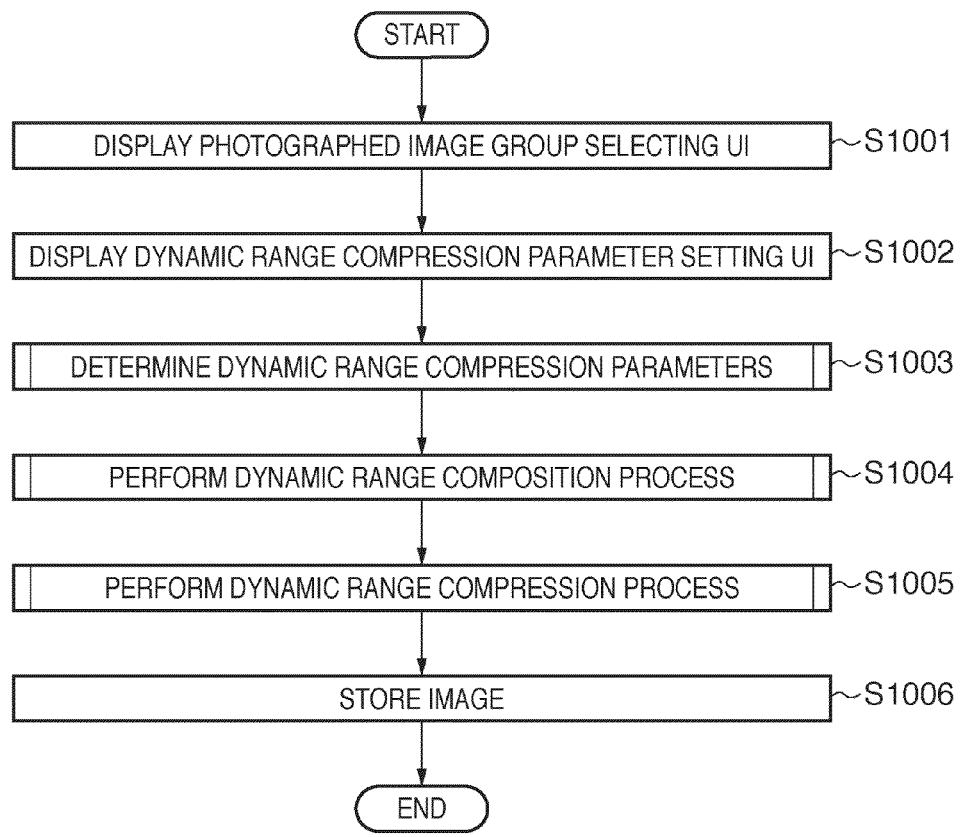
FIG. 2 is a schematic flowchart showing the operation of the image processing apparatus according to the first embodiment.

FIG. 2 is a schematic flowchart showing the operation of the image processing apparatus according to the first embodiment. Here, the following operation is realized by the CPU 104 executing a control program stored in the ROM 105.

Figure 3:
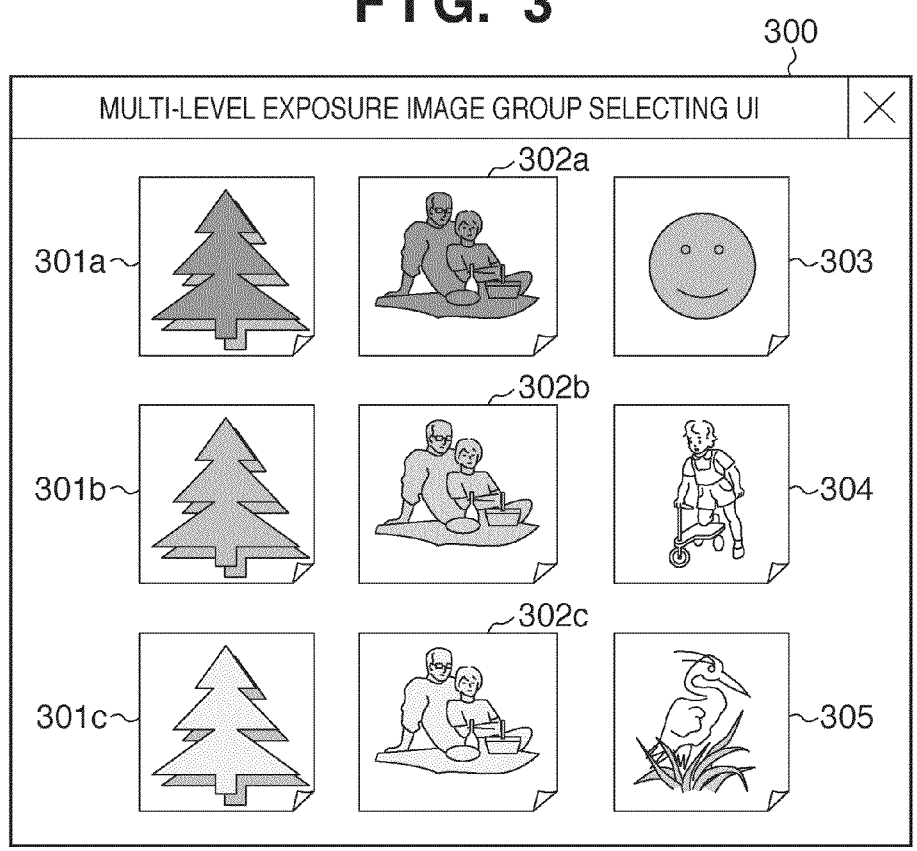
FIG. 3 is a view showing an example of an image group display UI for selecting a multi-level exposure image group.

In step S1001, the display portion 103 displays a multi-level exposure image group selecting UI 300. Here, a multi-level exposure image group refers to a plurality of sets of image data having different exposures for the same scene. FIG. 3 is a view showing an example of the multi-level exposure image group selecting UI. A user uses the input portion 101 to select a multi-level exposure image group (e.g., three images 301a to 301c in the left in FIG. 3). In the following description, it is assumed that each set of image data is 24-bit image data (8 bits for each of RGB) (M-bit image data).

Figure 4:
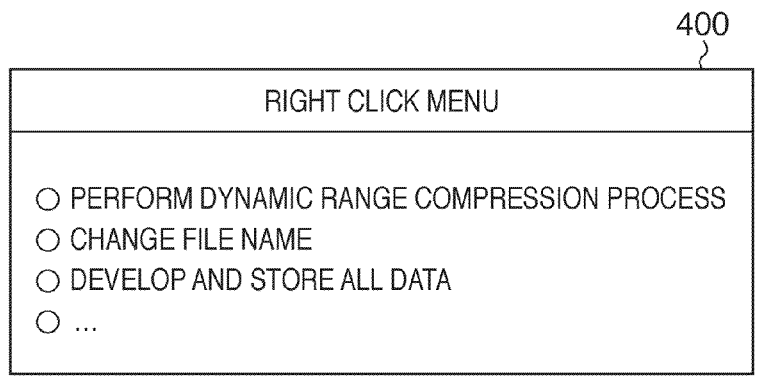
FIG. 4 is a view showing an example of a UI for selecting whether or not to perform a dynamic-range compression process.
Figure 5:
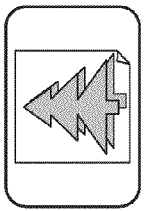
FIG. 5 is a view showing an example of a setting UI for setting a dynamic-range compression process.
Figure 6:
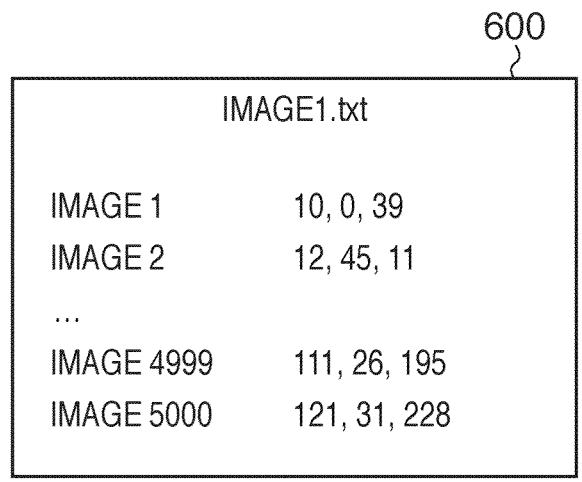
FIG. 6 is a view showing an example of an image file.
Figure 7:
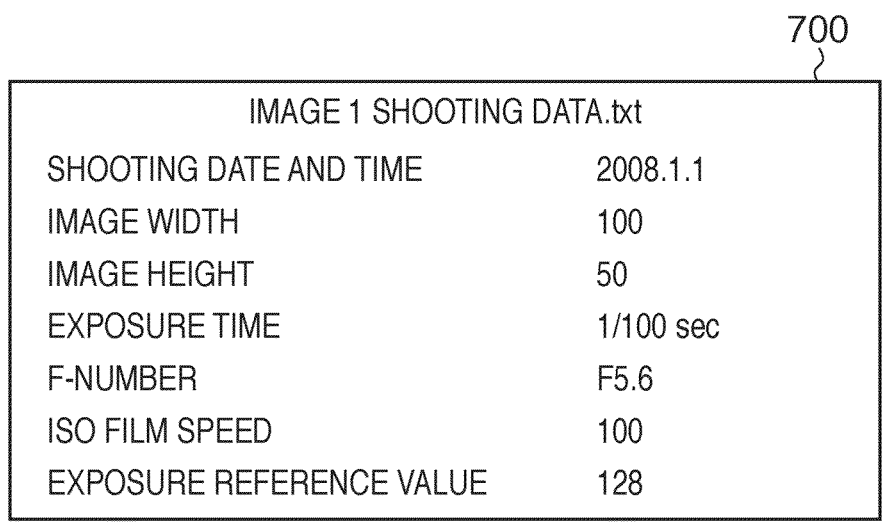
FIG. 7 is a view showing an example of shooting data.

In step S1002, the display portion 103 displays a dynamic-range compression parameter setting UI. This step is executed, for example, by performing a predetermined operation via the input portion 101 in a state where a multi-level exposure image group is selected. For example, a right click menu UI 400 shown in FIG. 4 is displayed by clicking the right mouse button. Then, when the user selects "dynamic-range compression process" from the right click menu UI 400, a dynamic-range compression parameter setting UI 500 shown in FIG. 5 is displayed. At that time, the CPU 104 preferably reads image data and shooting data of the selected multi-level exposure image group into the RAM 106, and performs preview display as shown in FIG. 5. Here, "image data" refers to data in which 8-bit RGB values for all pixels are recorded as shown in 600 of FIG. 6. Furthermore, "shooting data" refers to data (meta data) in which an image width, an image height, a shooting date and time, an exposure time, an F-number, an ISO film speed, and a reference luminance value are recorded as information at the time of shooting as shown in 700 of FIG. 7. Here, Exif data may be used as shooting data.

In step S1003, dynamic-range compression parameters (characteristic parameters of tone compression) are determined according to instructions received from the user via the dynamic-range compression parameter setting UI 500. Here, dynamic-range compression parameters refer to a reference luminance, a maximum luminance, a correction method, and a correction degree of a proper exposure image. The details of step S1003 will be described later. This step corresponds to a characteristic parameter setting unit in the claims.

In step S1004, images in the multi-level exposure image group selected in step S1001 and recorded in the RAM 106 are combined, and an HDR image (N-bit composite image data) is generated. The details of step S1004 will be described later.

In step S1005, a dynamic-range compression process (luminance tone compression process) is performed on the HDR image generated in step S1004 according to the dynamic-range compression parameters determined in step S1003, and dynamic-range-compressed HDR image data (M-bit composite image data) is generated. The details of step S1005 will be described later.

In step S1006, the HDR image data (image data having a high dynamic range) after the dynamic-range compression process is stored in the data storage portion 102, and the processing ends.

Details of the Dynamic-Range Compression Parameter Determining Process (Step S1003)

Figure 8:
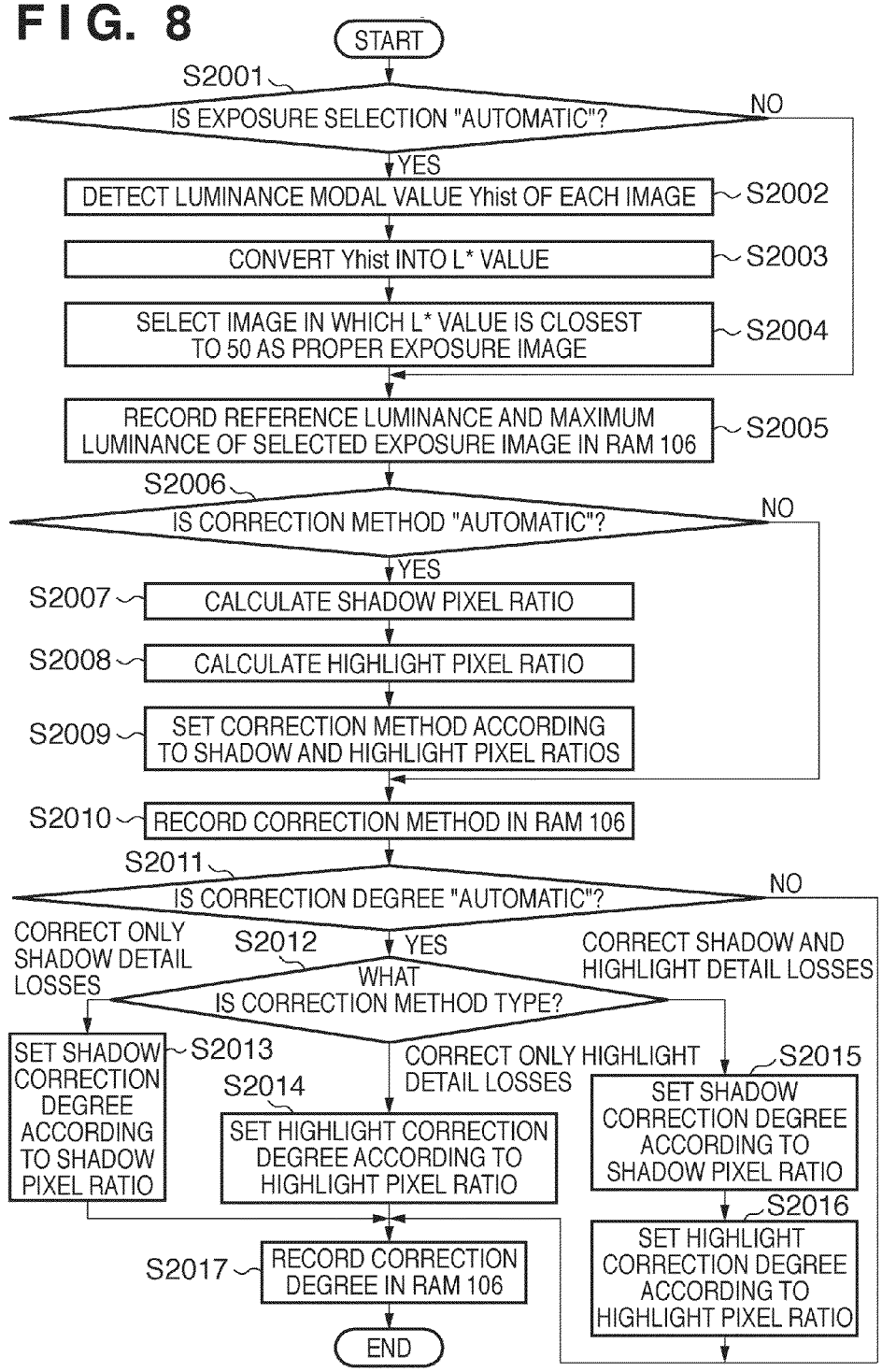
FIG. 8 is a detailed flowchart of a process that determines dynamic-range compression parameters.

FIG. 8 shows an example of a flowchart of the process in step S1003. As described above, in step S1002, a multi-level exposure image group (a plurality of sets of image data having different exposure amounts) that is to be subjected to a "dynamic-range compression process" has been selected.

In step S2001, it is determined whether or not selection of a proper exposure image is "automatic" in the dynamic-range compression parameter setting UI. If the selection is "automatic", the procedure advances to step S2002, and, if the selection is not "automatic", the procedure advances to step S2005. Here, "automatic" refers to a mode in which the image processing apparatus 100 automatically selects and determines processes without receiving designations of various parameters directly from a user.

In step S2002, a luminance modal value $Y_{hist}$ is detected for each of the plurality of sets of selected image data. Then, in step S2003, the luminance modal value $Y_{hist}$ is converted into an L* value ($L^*_{hist}$) according to Equation (1).

If $Y_{hist}/255 < 0.008856$, $$L^*_{hist} = 116\{7.787 \times (Y_{hist}/255) + 16/116\} - 16$$

If $Y_{hist}/255 \geq 0.008856$, $$L^*_{hist} = 116(Y_{hist}/255)^{1/3} - 16 \qquad (1)$$

In step S2004, an exposure image in which $L^*_{hist}$ is the closest to 50 is selected as a proper exposure image (reference image data). Then, in step S2005, a reference luminance value $Y_{Ref}$ and a maximum luminance value $Y_{Max}$ of the proper exposure image selected in step S2004 or by the user are recorded in the RAM 106. Here, the reference luminance value $Y_{Ref}$ may be received from the user via a UI, or may be automatically set.

In step S2006, it is determined whether or not selection of a correction method is "automatic" in the dynamic-range compression parameter setting UI, and, if the selection is "automatic", the procedure advances to step S2007, and, if the selection is not "automatic", the procedure advances to step S2010.

In step S2007, the shadow pixel ratio of the selected proper exposure image is calculated (shadow pixel ratio determining unit). The shadow pixel ratio refers to the ratio of the number of pixels in which the luminance value is not greater than a given value (first luminance value) (e.g., "20") with respect to the total number of pixels. Furthermore, in step S2008, the highlight pixel ratio of the selected proper exposure image is calculated (highlight pixel ratio determining unit). The highlight pixel ratio refers to the ratio of the number of pixels in which the luminance value is at least a given value (second luminance value) (e.g., "235") with respect to the total number of pixels. Here, the first luminance value is a value smaller than the reference luminance, and the second luminance value is a value larger than the reference luminance.

In step S2009, a correction method is selected using a correction-method determining table according to the shadow pixel ratio and the highlight pixel ratio. FIG. 17 is a view showing an example of a correction-method determining table. Then, in step S2010, the correction method selected in step S2009 or by the user is recorded in the RAM 106.

In step S2011, it is determined whether or not selection of a correction degree is "automatic" in the dynamic-range compression parameter setting UI, and, if the selection is "automatic", the procedure advances to step S2012, and, if the selection is not "automatic", the procedure advances to step S2017.

In step S2012, the correction method recorded in the RAM 106 in step S2010 is read, and, if the method is "correction of shadow detail losses", the procedure advances to step S2013, if the method is "correction of highlight detail losses", the procedure advances to step S2014, and, if the method is "correction of shadow and highlight detail losses", the procedure advances to step S2015. Then, in steps S2013 to S2016, at least one of a shadow correction degree and a highlight correction degree is determined according to a correction-degree determining table. Here, "correction of highlight detail losses" refers to correction that performs compression so as to reduce highlight detail losses in an image, and "correction of shadow detail losses" refers to correction that performs compression so as to reduce shadow detail losses in an image. FIG. 18 is a view showing an example of a correction-degree determining table.

In step S2017, the correction degree determined in steps S2013 to S2016 or selected by the user is recorded in the RAM 106, and the processing ends.

Details of the Dynamic-Range Composition Process (Step S1004)

Figure 9:
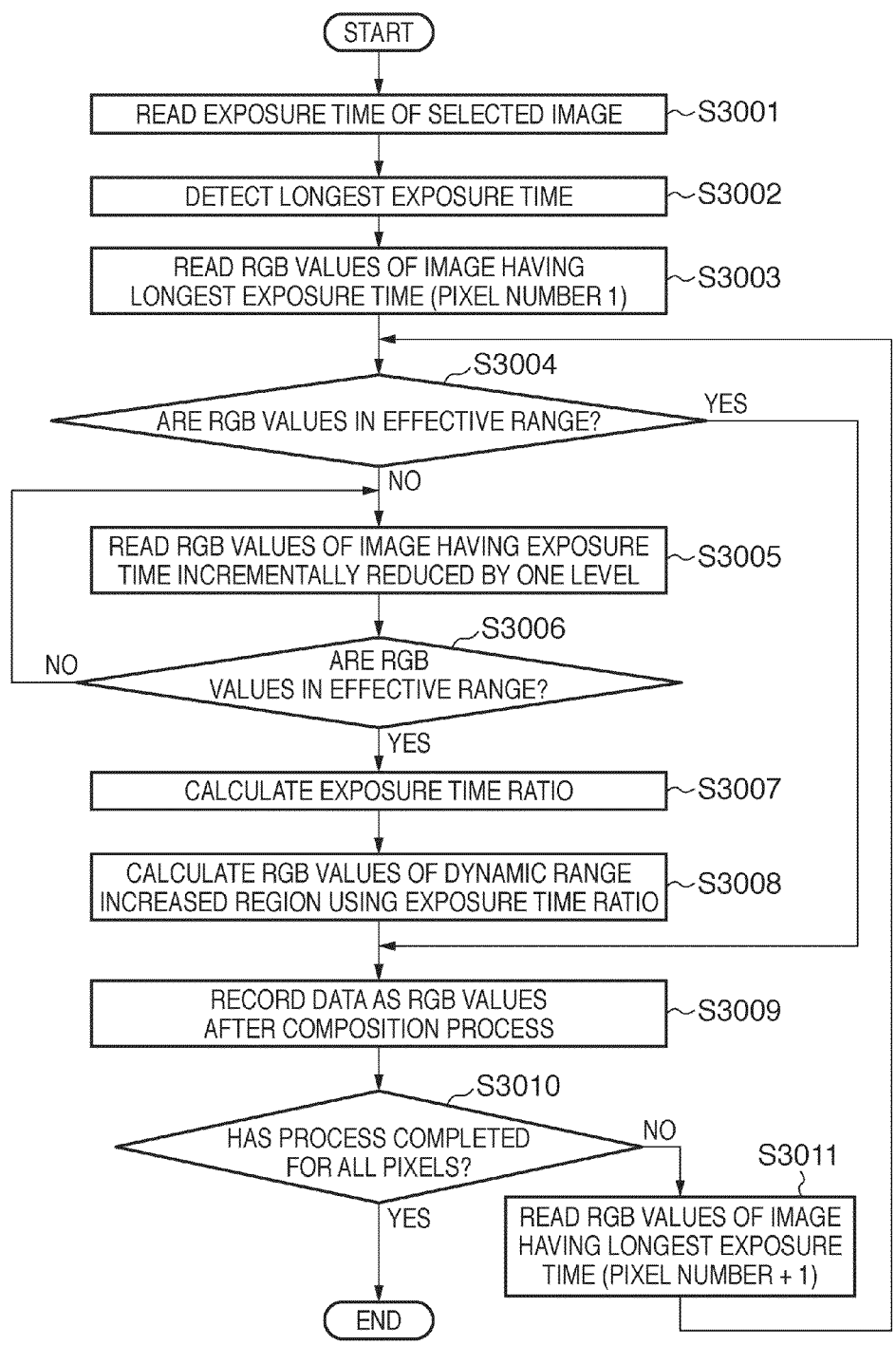
FIG. 9 is detailed flowchart of a dynamic-range composition process.
Figure 10:
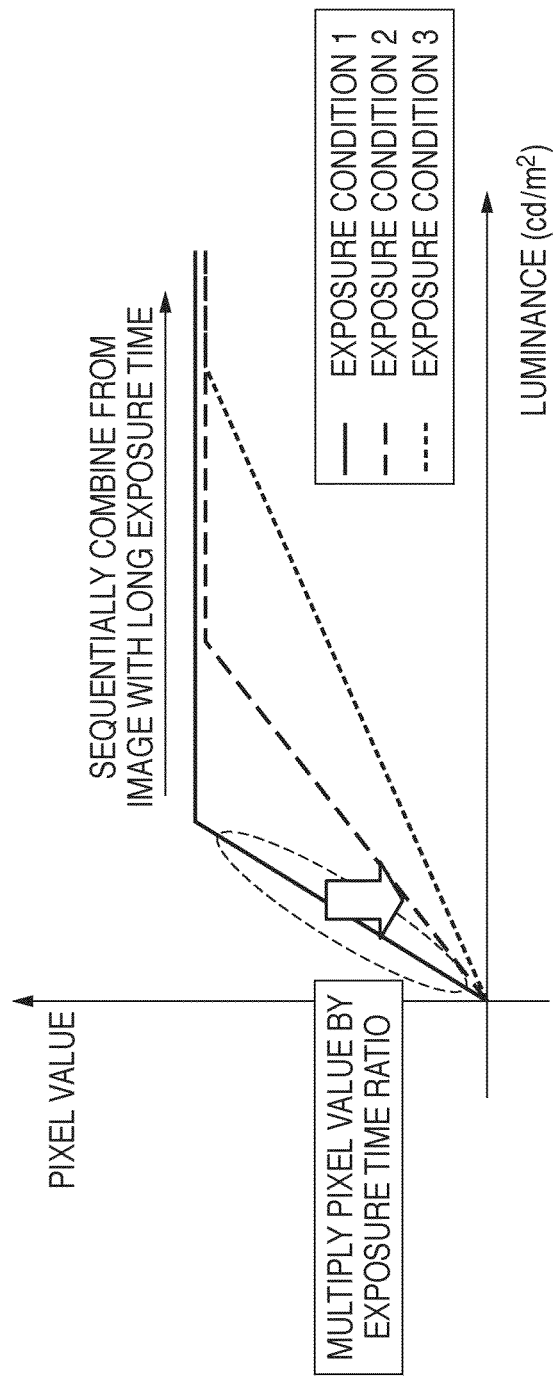
FIG. 10 is a graph illustrating a dynamic-range composition process.

FIG. 9 shows an example of a flowchart of the process in step S1004. In this step, as shown in FIG. 10, an image with much exposure is multiplied by a composition gain, and the obtained data is sequentially combined with an image with low exposure. In the following description, it is assumed that a multi-level exposure image group (a plurality of sets of image data) includes images having the same F-number, and obtained by varying the exposure time.

In step S3001, an exposure time ET is read from shooting data corresponding to the multi-level exposure images recorded in the RAM 106 in step S1002. Then, in step S3002, the longest exposure time ETmax is detected.

In step S3003, RGB values corresponding to the pixel number "1" of the image having the longest exposure time are read. Then, in step S3004, it is determined whether or not the RGB values are pixel values in which there is no highlight or shadow detail loss, and, if they are pixel values in which there is a highlight or shadow detail loss, the procedure advances to step S3005, and, if they are pixel values in which there is no highlight or shadow detail loss, the procedure advances to step S3009. Here, pixel values in which there is no highlight or shadow detail loss refer to pixel values satisfying 0<RGB<255. That is to say, if the RGB pixel value is 255, it is determined that there is a highlight detail loss, and, if the RGB pixel value is 0, it is determined that there is a shadow detail loss.

In step S3005, RGB values corresponding to the same pixel number of an image having an exposure time incrementally reduced by one level (having a ½ exposure time) are read. Then, in step S3006, it is determined whether or not the RGB values are pixel values in which there is no highlight or shadow detail loss, and, if they are pixel values in which there is a highlight or shadow detail loss, the procedure returns to step S3005, and, if they are pixel values in which there is no highlight or shadow detail loss, the procedure advances to step S3007.

In step S3007, an exposure time ratio ETR between the exposure time ET of the selected image and the longest exposure time ETmax is calculated according to Equation (2).

$$ETR = \frac{ET}{ET\max} \quad (2)$$

In step S3008, RGB values $RGB_{HDR}$ after the dynamic-range composition process are calculated according to Equation (3) using the RGB values of the selected image and the exposure time ratio ETR.

$$RGB_{HDR} = RGB \times ETR \quad (3)$$

In step S3009, the RGB values $RGB_{HDR}$ after the dynamic-range composition process are recorded in the RAM 106.

In step S3010, it is determined whether or not the RGB values after the dynamic-range composition process are recorded in the RAM 106 for all pixels, and, if the RGB values are not recorded for all pixels, the procedure advances to step S3011. Then, in step S3011, RGB values corresponding to the next pixel number of the image having the longest exposure time are read, and the procedure returns to step S3004.

These steps are performed for each pixel, and, if it is determined in step S3010 that the RGB values are recorded for all pixels, the processing ends.

Details of the Dynamic-Range Compression Process (Step S1005)

Figure 11:
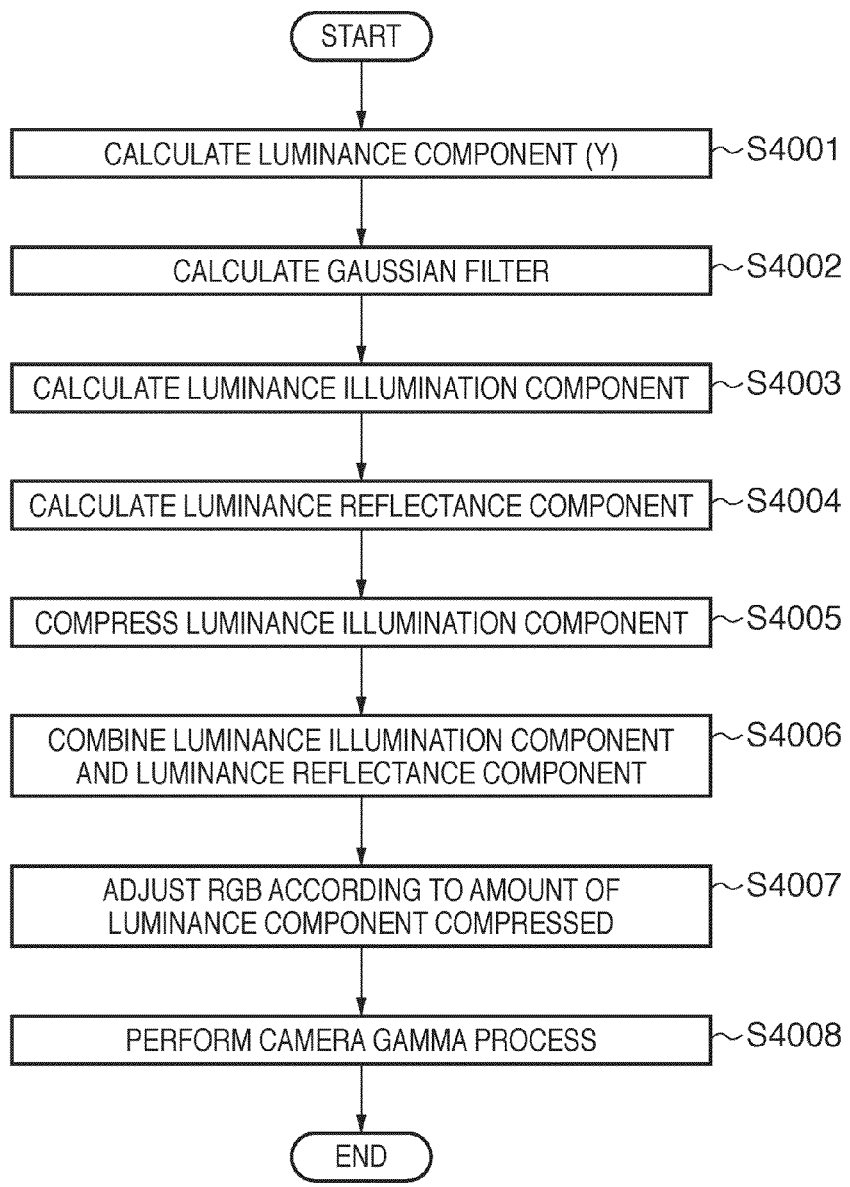
FIG. 11 is a detailed flowchart of a dynamic-range compression process.
Figure 12:
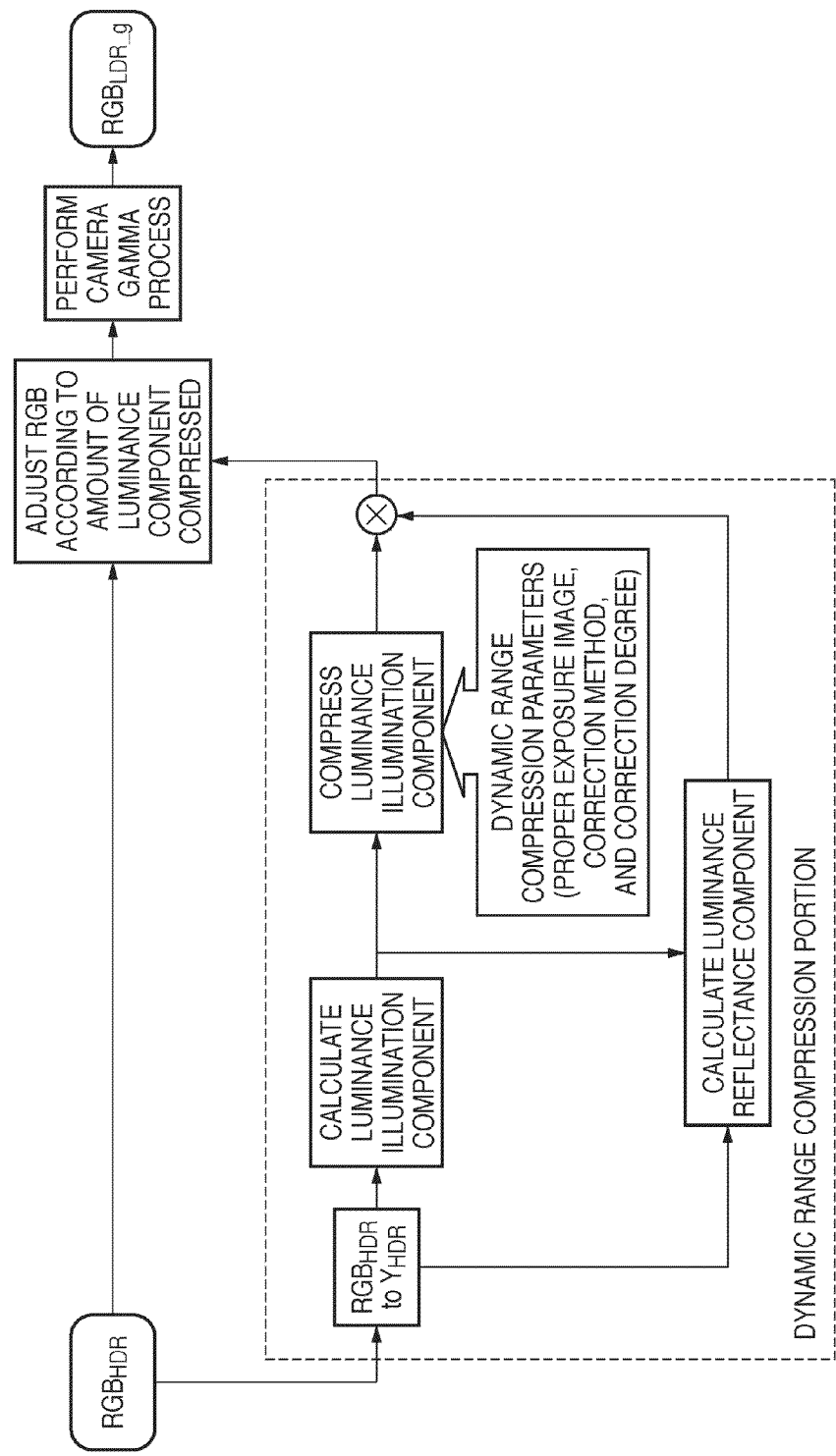
FIG. 12 is a diagram illustrating a dynamic-range compression process.

FIG. 11 shows an example of a flowchart of the process in step S1005. FIG. 12 shows a detailed functional block diagram according to step S1005. More specifically, dynamic-range compression is performed using the Retinex model as shown by Kuang et al. in the above-mentioned document. More specifically, a luminance component is divided into a luminance illumination component and a luminance reflectance component, and dynamic-range compression is performed only on the luminance illumination component. That is to say, the fact that human vision is insensitive to a luminance illumination component is used. Here, when a low-pass filtering process having a predetermined cut-off frequency is performed on an HDR image, the luminance illumination component is obtained as an image component having a frequency lower than the predetermined frequency.

In step S4001, a luminance component $Y_{HDR}$ is calculated from the RGB values ($RGB_{HDR}$) of the HDR image according to Equation (4).

$$Y_{HDR} = (0.299 \; 0.587 \; 0.114) \begin{pmatrix} R_{HDR} \\ G_{HDR} \\ B_{HDR} \end{pmatrix} \quad (4)$$

In step S4002, a Gaussian filter is calculated according to Equation (5). Here, a distribution S of the Gaussian filter is set to ⅕ the number of pixels of an image width W, and S is set such that the range where the filtering process is performed (−S to S) contains approximately 95% of the integral values of the Gaussian function.

$$\text{Filter}(a, b) = \frac{1}{k} \exp\left\{-\frac{a^2 + b^2}{2\left(\frac{S}{2}\right)^2}\right\}, \quad -S \leq a, b \leq S \quad (5)$$

$$k = \sum_{a=-S}^{S} \sum_{b=-S}^{S} \exp\left\{-\frac{a^2 + b^2}{2\left(\frac{S}{2}\right)^2}\right\}, \quad S = W/5$$

In step S4003, a luminance illumination component $Y_{Illum\_HDR}$ is calculated by performing a discrete convolution on the luminance component $Y_{HDR}$ and the Gaussian filter according to Equation (6).

$$Y_{Illum\_HDR}(x, y) = \sum_{a=-S}^{S} \sum_{b=-S}^{S} Y_{HDR}(x-a, y-b) \text{Filter}(a, b) \quad (6)$$

$$x = 0, \ldots, M-1, y = 0, \ldots, N-1$$

In step S4004, a luminance reflectance component $Y_{Reflectance}$ is calculated according to Equation (7).

$$Y_{Reflectance} = \frac{Y_{HDR}}{Y_{Illum\_HDR}} \quad (7)$$

In step S4005, a compressed luminance illumination component $Y_{Illum\_LDR}$ is calculated by compressing the luminance illumination component. The details of step S4005 will be described later.

In step S4006, $Y_{LDR}$ is calculated by combining the compressed luminance illumination component $Y_{Illum\_LDR}$ and the luminance reflectance component $Y_{Reflectance}$ according to Equation (8).

$$Y_{LDR} = Y_{Illum\_LDR} \times Y_{Reflectance} \quad (8)$$

In step S4007, the RGB values ($RGB_{HDR}$) of the HDR image are adjusted to calculate $RGB_{LDR}$, using the luminance components $Y_{HDR}$ and $Y_{LDR}$ before and after the dynamic-range compression process according to Equation (9). That is to say, the color components are adjusted according to the amount of luminance components changed.

$$\begin{pmatrix} R_{LDR} \\ G_{LDR} \\ B_{LDR} \end{pmatrix} = \frac{Y_{LDR}}{Y_{HDR}} \begin{pmatrix} R_{HDR} \\ G_{HDR} \\ B_{HDR} \end{pmatrix} \quad (9)$$

In step S4008, $RGB_{LDR\_g}$ is calculated by performing a camera gamma process on the RGB values ($RGB_{LDR}$) after the dynamic-range compression process according to Equation (10) and recorded in the RAM 106, and the processing ends. The camera gamma process refers to a process that corrects gamma characteristics based on dynamic-range characteristics of an image output device (gamma characteristic correcting unit).

$$\begin{pmatrix} R_{LDR\_g} \\ G_{LDR\_g} \\ B_{LDR\_g} \end{pmatrix} = \begin{pmatrix} R_{LDR}^{0.45} \\ G_{LDR}^{0.45} \\ B_{LDR}^{0.45} \end{pmatrix} \quad (10)$$

Details of the Luminance Illumination Component Compression Process (Step S4005)

Figure 13:
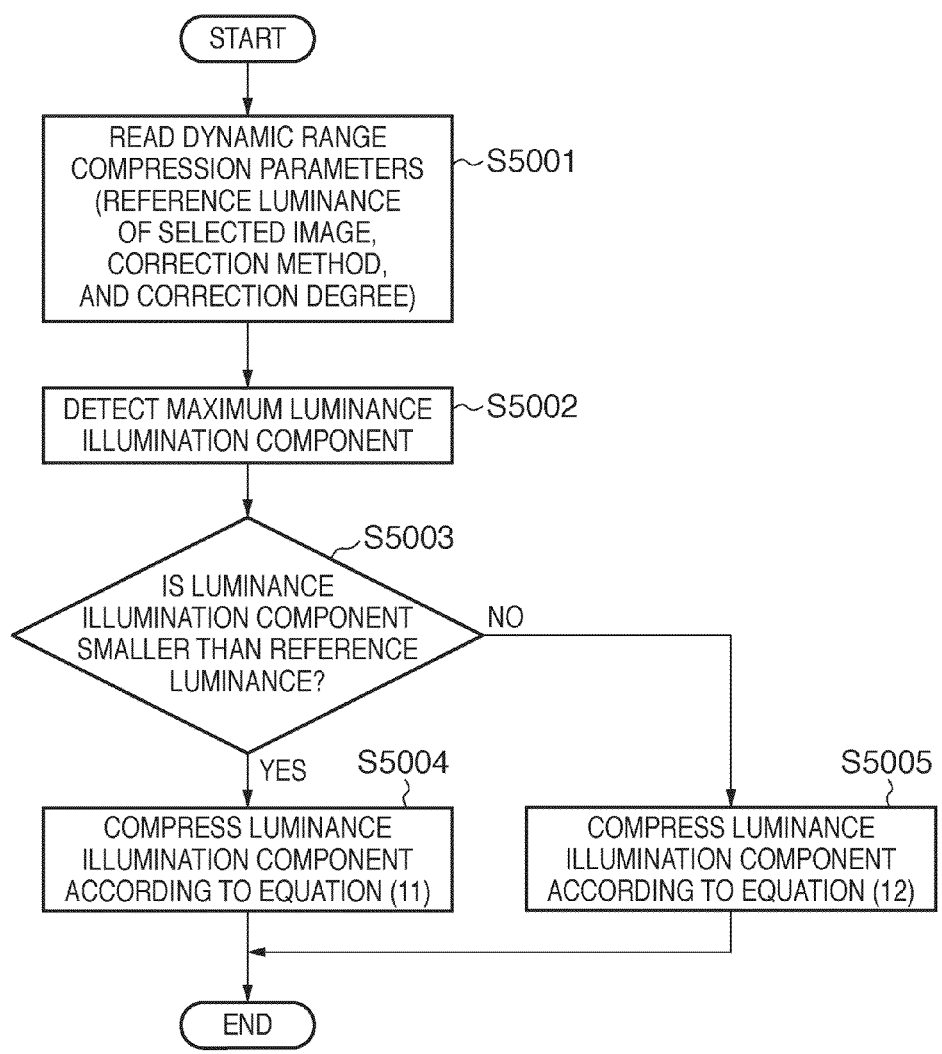
FIG. 13 is a detailed flowchart of a compression process of a luminance illumination component.
Figure 14:
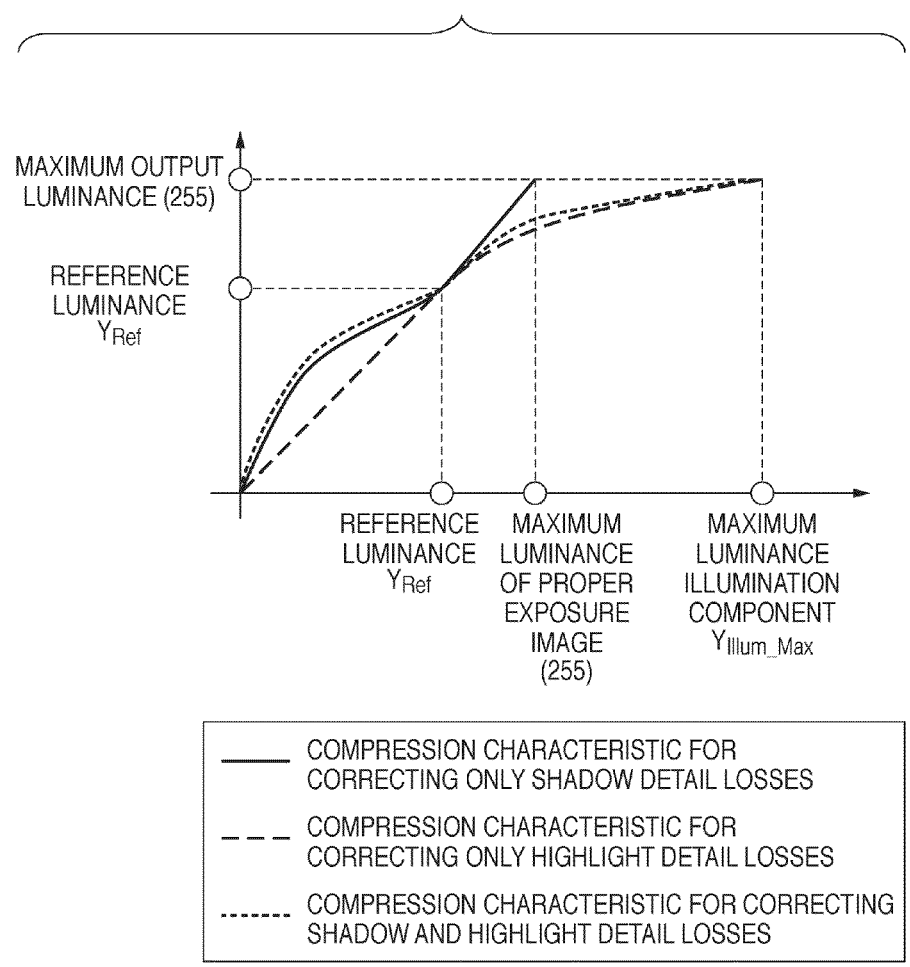
FIG. 14 is a graph showing an example of compression characteristics of a luminance illumination component according to a correction method.

FIG. 13 shows a detailed flowchart of the process in step S4005. FIG. 14 shows exemplary compression characteristic curves of luminance illumination components respectively in the case of "correction of shadow detail losses", "correction of highlight detail losses", and "correction of shadow and highlight detail losses".

In step S5001, the dynamic-range compression parameters (the reference luminance of the selected image, the correction method, and the correction degree) are read.

In step S5002, a maximum luminance illumination component $Y_{Illum\_MAX}$ in the HDR image is detected.

In step S5003, it is determined whether or not the luminance illumination component $Y_{Illum\_HDR}$ is smaller than the reference luminance value $Y_{Ref}$. If the luminance illumination component is smaller, the procedure advances to step S5004, and, if the luminance illumination component is larger, the procedure advances to step S5005.

Figure 15:
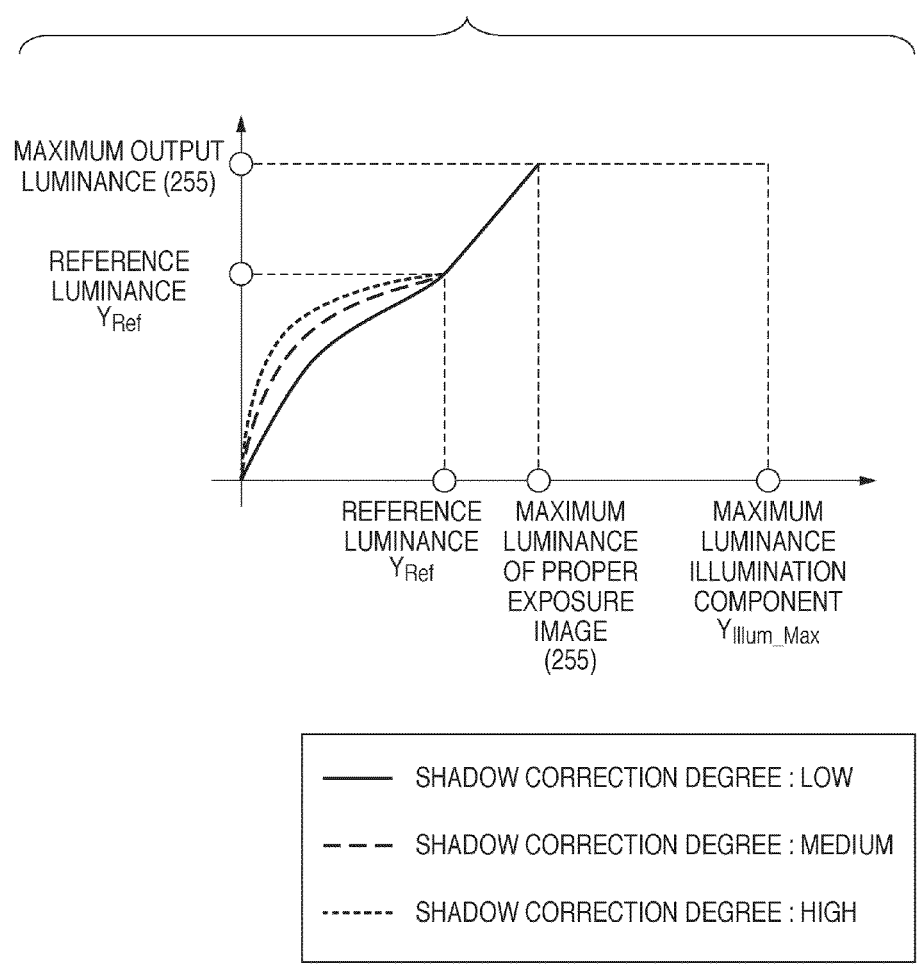
FIG. 15 is a graph showing compression characteristics of a luminance illumination component in which a shadow detail loss is corrected according to a correction degree.

In step S5004, a compressed luminance illumination component $Y_{Illum\_LDR}$ is calculated by compressing the luminance illumination component $Y_{Illum\_HDR}$ according to Equation (11). Here, SCD in Equation (11) refers to a shadow correction degree, and is set in advance, for example, as in the SCD table shown in FIG. 19. According to the set shadow correction degree, correction is performed with compression characteristics as shown in FIG. 15.

$$Y_{Illumi\_LDR} = \left( \frac{Y_{Illum\_HDR}}{Y_{Ref}} \right)^{SCD} \times Y_{Ref} \quad (11)$$

Figure 16:
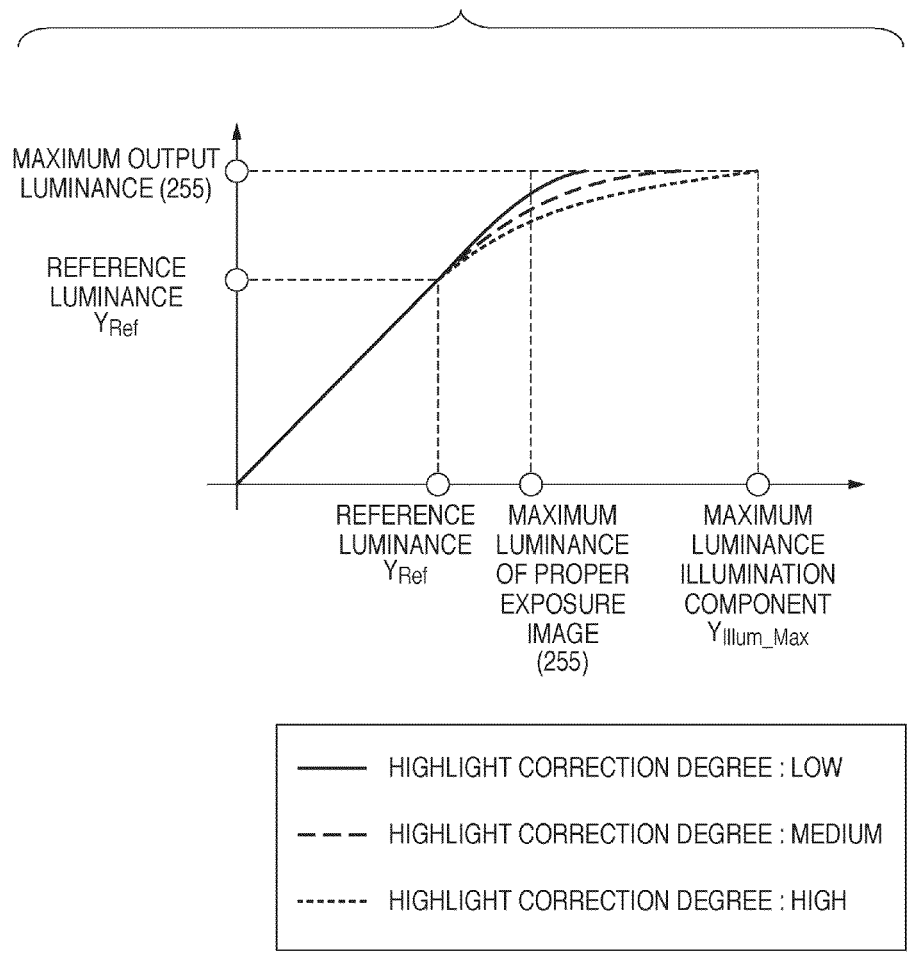
FIG. 16 is a graph showing compression characteristics of a luminance illumination component in which a highlight detail loss is corrected according to a correction degree.

In step S5005, a compressed luminance illumination component $Y_{Illum\_LDR}$ is calculated by compressing the luminance illumination component $Y_{Illum\_HDR}$ according to Equation (12). Here, HCD in Equation (12) refers to a highlight correction degree, and set in advance, for example, as in the HCD table shown in FIG. 20. According to the set highlight correction degree, shown correction is performed with compression characteristics as shown in FIG. 16.

$$Y_{Illumi\_LDR} = \alpha \times Y_{Illumi\_LDR}^{\gamma} \quad (12)$$

$$\gamma = \frac{\log_{10}\left\{ \frac{Y_{Ref}}{(255/HCD)} \right\}}{\log_{10}\left\{ \frac{Y_{Ref}}{Y_{Illumi\_MAX}} \right\}}$$

$$\alpha = \frac{(255/HCD) - Y_{Ref}}{Y_{Illumi\_MAX}^{\gamma} - Y_{Ref}^{\gamma}}$$

As described above, with the image processing apparatus according to the first embodiment, a dynamic-range compression process is performed on an HDR image using, as a reference, predetermined image data contained in a multi-level exposure image group. Accordingly, tone correction can be performed taking advantage of an HDR technique while avoiding photographic reproduction that seems strange.

Modified Example

Image File

In the description of the first embodiment, each set of image data contained in a multi-level exposure image group is 24-bit image data (8 bits for each of RGB). Furthermore, in the description, an image width, an image height, a shooting date and time, an optical sensor width, a lens focal distance, a magnified ratio, an exposure time, an F-number, an ISO film speed are recorded as shooting data. However, so-called raw data may be used as image data contained in a multi-level exposure image group.

Composition Method

In the first embodiment, an image with high exposure is multiplied by a composition gain, and the obtained data is sequentially combined with an image with low exposure. However, there is no limitation to this method, as long as a composition gain is used to combine images having different exposures. For example, an image with low exposure may be multiplied by a composition gain, and the obtained data may be sequentially combined with an image with high exposure.

Correction Method

In the first embodiment, as a correction method of an image, a reference luminance is maintained before and after a dynamic-range compression process. However, there is no limitation to this, and, for example, a face-detecting process is performed on an image, and a luminance value $Y_{face}$ of a portion determined as a "face" may be used as a reference luminance value $Y_{Ref}$. Here, the reference luminance is not limited to a luminance of a "face", and a luminance of a given important subject contained in the image may be used. Here, a method for detecting an important subject from an image is disclosed, for example, in Japanese Patent Laid-Open No. 2005-063406.

Dynamic-Range Compression Method

In the first embodiment, as a dynamic-range compression method, a low-frequency component of an image extracted using a Gaussian filter is compressed. However, there is no limitation to this, as long as a low-frequency component of an image is compressed using the Retinex model. For example, a method is also applicable in which a simple-average filtering process is performed on image data as shown in Equation (13).

$$FilteredImg(x, y) = \frac{1}{4S^2} \sum_{a=-S}^{S} \sum_{b=-S}^{S} Img(x+a, x+b) \quad (13)$$

where $x = 0, \ldots, M-1, y = 0, \ldots, N-1, S = W/5$

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-167264, filed Jul. 15, 2009, which is hereby incorporated by reference herein in its entirety.

The invention claimed is:

1. An image processing apparatus, comprising:
an input unit configured to input a plurality of sets of M-bit image data that are to be combined;
a determining unit configured to determine reference image data serving as an exposure reference from among the plurality of sets of input M-bit image data;
a composition unit configured to combine the plurality of sets of M-bit image data, and generate one set of N-bit composite image data (N>M);
a characteristic parameter setting unit configured to set a characteristic parameter of tone compression on the N-bit composite image data such that a predetermined reference luminance in the reference image data does not change; and
a generating unit configured to generate M-bit composite image data by compressing a luminance tone of an image component contained in the N-bit composite image data and having a frequency lower than a predetermined frequency based on the set characteristic parameter,
wherein the image processing apparatus further comprises at least one of:
a shadow pixel ratio determining unit configured to determine a shadow pixel ratio, which is the ratio of the number of pixels having a luminance value smaller than a first predetermined luminance value with respect to the total number of pixels, in the reference image data; and
a highlight pixel ratio determining unit configured to determine a highlight pixel ratio, which is the ratio of the number of pixels having a luminance value larger than a second predetermined luminance value with respect to the total number of pixels in the reference image data,
wherein the characteristic parameter setting unit sets a characteristic parameter that reduces a shadow detail loss of a pixel of the N-bit composite image data having a pixel value smaller than the predetermined reference luminance according to the shadow pixel ratio, and sets a characteristic parameter that reduces a highlight detail loss of a pixel of the N-bit composite image data having a pixel value larger than the predetermined reference luminance according to the highlight pixel ratio.

2. The image processing apparatus according to claim 1, wherein the predetermined reference luminance is a luminance of a predetermined subject in the reference image data.

3. The image processing apparatus according to claim 1, wherein the predetermined frequency is a cut-off frequency of a low-pass filter used to extract a luminance illumination component in the Retinex model.

4. The image processing apparatus according to claim 1, wherein the generating unit adjusts a color component of the M-bit composite image data according to an amount of luminance tone changed by the compression.

5. The image processing apparatus according to claim 1, further comprising:
a gamma characteristic correcting unit configured to correct a gamma characteristic of the M-bit composite image data based on a dynamic range characteristic of an output device that outputs the M-bit composite image data.

6. A method for controlling an image processing apparatus, comprising:
an input step, in which an input unit inputs a plurality of sets of M-bit image data that are to be combined;
a determining step, in which a determining unit determines reference image data serving as an exposure reference from among the plurality of sets of input M-bit image data;
a composition step, in which a composition unit combines the plurality of sets of M-bit image data, and generates one set of N-bit composite image data (N>M);
a characteristic parameter setting step, in which a characteristic parameter setting unit sets a characteristic parameter of tone compression on the N-bit composite image data such that a predetermined reference luminance in the reference image data does not change; and
a generating step, in which a generating unit generates M-bit composite image data by compressing a luminance tone of an image component contained in the N-bit composite image data and having a frequency lower than a predetermined frequency based on the set characteristic parameter,
wherein the method further comprises at least one of:
a shadow pixel ratio determining step, in which a shadow pixel ratio determining unit determines a shadow pixel ratio, which is the ratio of the number of pixels having a luminance value smaller than a first predetermined luminance value with respect to the total number of pixels, in the reference image data; and
a highlight pixel ratio determining step, in which a highlight pixel ratio determining unit determines a highlight pixel ratio, which is the ratio of the number of pixels having a luminance value larger than a second predetermined luminance value with respect to the total number of pixels, in the reference image data;
wherein, in the characteristic parameter setting step, the characteristic parameter setting unit sets a characteristic parameter that reduces a shadow detail loss of a pixel of the N-bit composite image data having a pixel value smaller than the predetermined reference luminance according to the shadow pixel ratio, and sets a characteristic parameter that reduces a highlight detail loss of a pixel the N-bit composite image data having a pixel value larger than the predetermined reference luminance according to the highlight pixel ratio.

7. A non-transitory computer-readable storage medium storing a program for causing a computer to operate as the image processing apparatus according to claim 1.

* * * * *